United States Patent [19]

Eilenberger et al.

[11] Patent Number: 5,210,743

[45] Date of Patent: May 11, 1993

[54] SWITCHING ELEMENT WITH MULTIPLE OPERATING MODES AND SWITCHING NETWORK INCORPORATING A PLURALITY OF SUCH SWITCHING ELEMENTS, IN PARTICULAR FOR SWITCHING ASYNCHRONOUS TIME-DIVISION MULTIPLEX PACKETS

[75] Inventors: Gert Eilenberger; Karl Schrodi; Bodo Pfeiffer, all of Allemagne Federale, Fed. Rep. of Germany; Jean-Michel Delmas, Montrouge, France

[73] Assignee: Alcatel N.V., Amsterdam, Netherlands

[21] Appl. No.: 668,993

[22] Filed: Mar. 12, 1991

[30] Foreign Application Priority Data

Mar. 14, 1990 [FR] France ............... 90 03244
Mar. 14, 1990 [FR] France ............... 90 03245

[51] Int. Cl.$^5$ .......................... H04Q 11/04; H04J 3/24
[52] U.S. Cl. ..................................... 370/60; 370/94.1
[58] Field of Search ................. 370/60, 60.1, 94.1

[56] References Cited

U.S. PATENT DOCUMENTS

| | | | |
|---|---|---|---|
| 4,706,240 | 11/1987 | Payne, III | 370/60 |
| 4,813,037 | 3/1989 | Debuysscher et al. | 370/94.1 |
| 4,862,454 | 8/1989 | Dias et al. | 370/94.1 |
| 4,864,560 | 9/1989 | Quinquis et al. | 370/60 |
| 4,922,487 | 5/1990 | Eilenberger et al. | 370/60 |
| 4,947,388 | 8/1990 | Kuwahara et al. | 370/94.1 |
| 4,964,119 | 10/1990 | Endo et al. | 370/94.1 |
| 5,079,762 | 1/1992 | Tanube | 370/94.1 |

FOREIGN PATENT DOCUMENTS 0260364 3/1988 European Pat. Off. .
0317930 5/1989 European Pat. Off. .
8900366 1/1989 PCT Int'l Appl. .

OTHER PUBLICATIONS

M. Littlewood, et al., "Network Evolution Using Asynchronous Time Division Techniques", British Telecom. Eng., London, Jul. 6, 1987.

Primary Examiner—Douglas W. Olms
Assistant Examiner—Ajit Patel
Attorney, Agent, or Firm—Brunell & May

[57] ABSTRACT

A switching element with a plurality of operating modes, in particular for switching asynchronous time-division multiplexed packets, comprises inputs, outputs, a selective retransmission device for retransmitting a packet received on one input to one or more outputs on the basis of routing data associated with the packet, and a retransmission control device determining the mode of operation of the retransmission device. The retransmission control device comprises a direct routing device adapted to receive from the label of a packet received on one input a destination indication and to decode it into an output identifier corresponding to one output at least in order to retransmit the packet to an output designated by the identifier. It additionally comprises a translated routing device adapted to receive from the label of a packet received on one input a reference number and to translate it using a translation memory into one or more output identifiers each corresponding to at least one output for retransmitting the packet to one output for each output identifier designated by the identifier. It additionally comprises a routing mode selector device adapted to receive from the label of a packet received on one input routing mode data and adapted to command selectively according to the data the use of a selected routing device which may be one of the above-mentioned routing devices. The routing mode selector device commands alternately the use of at least one predetermined non-selective routing mode according to the routing mode data contained in the label of a received packet.

11 Claims, 2 Drawing Sheets

SWITCHING ELEMENT WITH MULTIPLE OPERATING MODES AND SWITCHING NETWORK INCORPORATING A PLURALITY OF SUCH SWITCHING ELEMENTS, IN PARTICULAR FOR SWITCHING ASYNCHRONOUS TIME-DIVISION MULTIPLEX PACKETS

BACKGROUND OF THE INVENTION

1. Field of the Invention

The present invention concerns a switching element with multiple operating modes and a switching network incorporating a plurality of such switching elements, in particular for switching asynchronous time-division multiplex packets, although this latter application is described by way of example only, the invention being of wider application.

2. Description of the Prior art

Packets are units of digital information including a label from which the destination of the packet can be identified and call data. Packets relating to a plurality of calls are transmitted over the same transmission link in any order.

For switching asynchronous time-division multiplex packets a switching element comprises inputs, outputs, selective retransmission means for retransmitting a packet received on one input to one or more outputs on the basis of routing data associated with the packet and, usually, retransmission control means which determine the mode of operation of said retransmission means.

A switching network using these switching elements comprises input ports, output ports and switching elements between the input ports and the output ports. The switching elements are arranged in one or more stages interconnected by links. The input ports of the switching network are associated with the inputs of switching elements of a first stage and the output ports are associated with the outputs of switching elements of a final stage. The outputs of the switching elements of said first stage are connected by links, possibly through intermediate switching element stages, to the inputs of the switching elements of said final stage.

The function of the network in packet switching is to route packets selectively between an input port of the network and at least one output port. To be more precise, there will be provision at least for so-called point-to-point routing from an input port to an output port and for so-called point-to-multipoint routing from an input port to a plurality of output ports.

French patent applications Nos. 8716475 and 8716476 describe a switching element that can be used to implement a switching network of this kind.

This switching element receives packets on its inputs and retransmits them selectively to its outputs. Two embodiments of the switching element are described. The first, referred to hereinafter as the direct routing embodiment, is for the situation in which the receive packets include a destination indication in a label. The destination indication is decoded in the switching element to obtain the identifier of at least one output to which the packet must be retransmitted, which identifier is then used directly to control retransmission of the packet to each output so designated. As the packet has to pass through other switching elements in a switching network, the destination indication is in a number of parts which are used successively. The second embodiment, referred to hereinafter as the translated routing embodiment, is for the situation in which the label includes a reference number called the virtual circuit number. In each switching element the reference number is used to address a translation memory which supplies in response the identifier of at least one output to which the packet must be retransmitted.

Note that with either type of routing the switching element itself is in no way involved in the designation of the outputs to which the packet is retransmitted. A unit external to the switching network must supply the routing data identifying the packet path or paths in the switching network, in other words either the destination indication included in the packet label in the first kind of switching element or the data written into the translation memories of the switching elements in the case of the second kind of switching element.

The direct routing switching element is particularly attractive because of its simplicity: it is sufficient to decode the destination indication to deduce the designation of the output to which a packet must be retransmitted in the case of point-to-point routing or the designations of the outputs to which the packet must be retransmitted in the case of point-to-multipoint routing. Its disadvantage is that it is not usable in practice if the switching network must be able to broadcast a packet arriving on any input port to any plurality of output ports. It is then necessary to make provision for the broadcast function to be implemented in any switching element of the switching network; in this switching element a received packet is retransmitted identically to a plurality of outputs. A plurality of switching elements of the next stage in the switching network will receive these identical packets. They will therefore have no means of routing the packet to any specified output as designated by a specific destination indication of the packet label. This type of switching element can therefore be used only in the final stage of a switching network comprising multiple switching element stages, and then provides only for broadcasting to the outputs of a single switching element, which does not meet the stated requirement.

The translated routing switching element does meet the requirement stated above with regard to broadcasting to any plurality of output ports but has its own disadvantages. The translation memory of each switching element must receive the output identifiers for each of the reference numbers likely to be routed by the switching element. As the reference number must not include too many digits, for reasons of transmission efficiency, the number of reference numbers available is limited which means that they have to be used again, which makes it necessary to provide new output identifiers in the translation memories of the switching elements each time and to erase them later and requires costly transmission resources to carry this out. There are even switching network configurations in which the first stages cross-connect the traffic so that a packet can be routed to any output of these first stages before being routed to its destination. The result of all this is that the routing of any packet must be preceded by the supply of routing data to practically all the switching elements of the switching network. This may be impracticable if there are a large number of switching elements.

The present invention is directed to solving this problem by proposing a switching element offering the advantages of both kinds of switching element described above but which largely circumvents the previously described disadvantages, together with a switching network comprising, at least in part, switching elements of this kind and exploiting their advantageous characteristics.

On a more general level, the switching element in accordance with the invention finds an application whenever it is necessary to route information by switching it, using at least the two routing methods described above, irrespective of the form of the information to be routed. The word "packet" as used in the present document is not to be understood as referring to a specific presentation of the switched information, but to the contrary has the widest possible meaning.

SUMMARY OF THE INVENTION

In one aspect, the present invention consists in a switching element with a plurality of operating modes, in particular for switching asynchronous time-division multiplexed packets, comprising inputs, outputs, selective retransmission means for retransmitting a packet received on one input to one or more outputs on the basis of routing data associated with said packet, and retransmission control means determining the mode of operation of said retransmission means, said retransmission control means comprising:

—a direct routing device adapted to receive from the label of a packet received on one input a destination indication and to decode it into an output identifier corresponding to at least one output in order to retransmit the packet to an output designated by said identifier, —a translated routing device adapted to receive from the label of a packet received on one input a reference number and to translate it using a translation memory into one or more output identifiers each corresponding to at least one output for retransmitting the packet to one output for each output identifier designated by said identifier, —routing mode selector means adapted to receive from the label of a packet received on one input routing mode data and adapted to command selectively according to said data the use of a selected routing device which may be one of the above-mentioned routing devices, in which switching element said routing mode selector means are also adapted to command alternately the use of at least one predetermined non-selective routing mode according to said routing mode data contained in the label of a received packet.

Said non-selective routing mode preferably encompasses a cross-connect routing mode in which the packet received is routed to one of the set of all outputs of the switching element.

As an alternative to this, said non-selective routing mode encompasses a broadcast routing mode in which the receive packet is routed to all the outputs of the switching element.

Said routing mode selector means are advantageously adapted to receive semi-permanent situation data from the switching element and to command selectively according to said semi-permanent data and said routing mode data the use of one of said routing devices.

The switching element in accordance with the invention therefore selects the routing mode allowing for the situation of the switching element, which situation may be the location of the switching element in a switching network, leading to the possibility of limiting recourse to translated routing mode to only some stages of a switching network, commensurately reducing requirements for transmission of routing data to the translation memories of the switching element.

Said routing mode selector means are preferably adapted to receive semi-permanent situation data from the switching element and to command selectively, according to said semi-permanent data and said routing mode data, use of one of said routing devices or the application of a non-selective routing mode.

Said routing mode selector means are preferably adapted to receive from the label of a packet received at one of the inputs routing mode data which specifies a switching element stage number in a switching network and said routing mode selector means are so arranged that the selected routing mode is used only if said stage number is equal to or greater than a value derived from said semi-permanent data.

Said routing mode selector means are preferably adapted to receive from the label of a packet received on one input routing mode data which specifies two routing modes and a switching element stage number in a switching network and said routing mode selector means are so arranged that a first of said specified routing modes is used if said stage number is less than a value derived from said semi-permanent data and the second of said specified routing modes is used if said stage number is equal to or greater than said derived value.

Said destination indication and said reference number preferably occupy the same field in the label of the packet and said routing mode selector means determine selective transmission of the information contained in said field either to said direct routing device or to said translated routing device.

Said routing mode selector means are preferably adapted to receive semi-permanent priority data from the switching element and to command selectively according to said semi-permanent data and said routing mode data the use or the inhibiting of any routing mode.

In a second aspect, the present invention consists in a switching network comprising input ports, output ports, switching elements arranged in a plurality of interconnected switching element stages, each switching element having inputs and outputs and being adapted to transfer a packet received on one of its inputs to one or more of its outputs, according to routing data associated with said packet, the input ports of the network corresponding to the inputs of switching elements of a first stage and the output ports of the network corresponding to the outputs of the switching elements of a final stage, wherein the switching elements of one stage at least of said switching network are each in the form of a switching element with a plurality of operating modes, in particular for switching asynchronous time-division multiplexed packets, comprising inputs, outputs, selective retransmission means for retransmitting a packet received on one input to one or more outputs on the basis of routing data associated with said packet, and retransmission control means determining the mode of operation of said retransmission means, said retransmission control means comprising:

—a direct routing device adapted to receive from the label of a packet received on one input a destination indication and to decode it into an output identifier corresponding to at least one output in order to retransmit the packet to an output designated by said identifier, —a translated routing device adapted to receive from the label of a packet received on one input a reference number and to translate it using a translation memory into one or more output identifiers each corresponding to at least one output for retransmitting the packet to one output for each output identifier designated by said identifier, —routing mode selector means adapted to receive from the label of a packet received on one input routing mode data and adapted to command selectively according to said data the use of a selected routing device which may be one of the above-mentioned routing devices, in which switching element said routing mode selector means are also adapted to command alternately the use of at least one predetermined non-selective routing mode according to said routing mode data contained in the label of a received packet.

The switching elements of all stages of said switching network are preferably each in the form of a switching element with a plurality of operating modes, in particular for switching asynchronous time-division multiplexed packets, comprising inputs, outputs, selective retransmission means for retransmitting a packet received on one input to one or more outputs on the basis of routing data associated with said packet, and retransmission control means determining the mode of operation of said retransmission means, said retransmission control means comprising:

—a direct routing device adapted to receive from the label of a packet received on one input a destination indication and to decode it into an output identifier corresponding to at least one output in order to retransmit the packet to an output designated by said identifier, —a translated routing device adapted to receive from the label of a packet received on one input a reference number and to translate it using a translation memory into one or more output identifiers each corresponding to at least one output for retransmitting the packet to one output for each output identifier designated by said identifier, —routing mode selector means adapted to receive from the label of a packet received on one input routing mode data and adapted to command selectively according to said data the use of a selected routing device which may be one of the above-mentioned routing devices, in which switching element said routing mode selector means are also adapted to command alternately the use of at least one predetermined non-selective routing mode according to said routing mode data contained in the label of a received packet.

In the switching elements of at least the first stages of the switching network, said semi-permanent data is preferably such that a cross-connect routing mode is used instead of the direct and translated routing modes, whereby any received packet is retransmitted to one of the set of all switching element outputs.

In the switching elements of at least the first stages of the switching network, said semi-permanent data is preferably such that a cross-connect routing mode is used instead of the direct and translated routing modes whereby any packet received is retransmitted to one of the set of all outputs of the switching element chosen randomly or quasi-randomly.

In the switching elements of at least the first stages of the switching network, said semi-permanent data is preferably such that a cross-connect routing mode is used instead of the direct and translated routing modes whereby any packet received is retransmitted to one of the set of all outputs of the switching element chosen to equalize the packet traffic load on the outputs.

Said first stages of the switching network are preferably such in number and so interconnected that they enable access of any packet from any input port to any output of the last one of said first stages and, in all the switching elements of several of said first stages at least, said semi-permanent data is such that neither the direct nor the translated routing mode is used, a cross-connect routing mode replacing them both, whereby any packet received is retransmitted to one of the set of all outputs of the switching element chosen so as to equalize the packet traffic load on the outputs.

The various objects and characteristics of the invention will now be described in more detail by way of non-limiting example only with reference to the appended diagrammatic drawings.

DETAILED DESCRIPTION OF THE INVENTION

Figure 1:
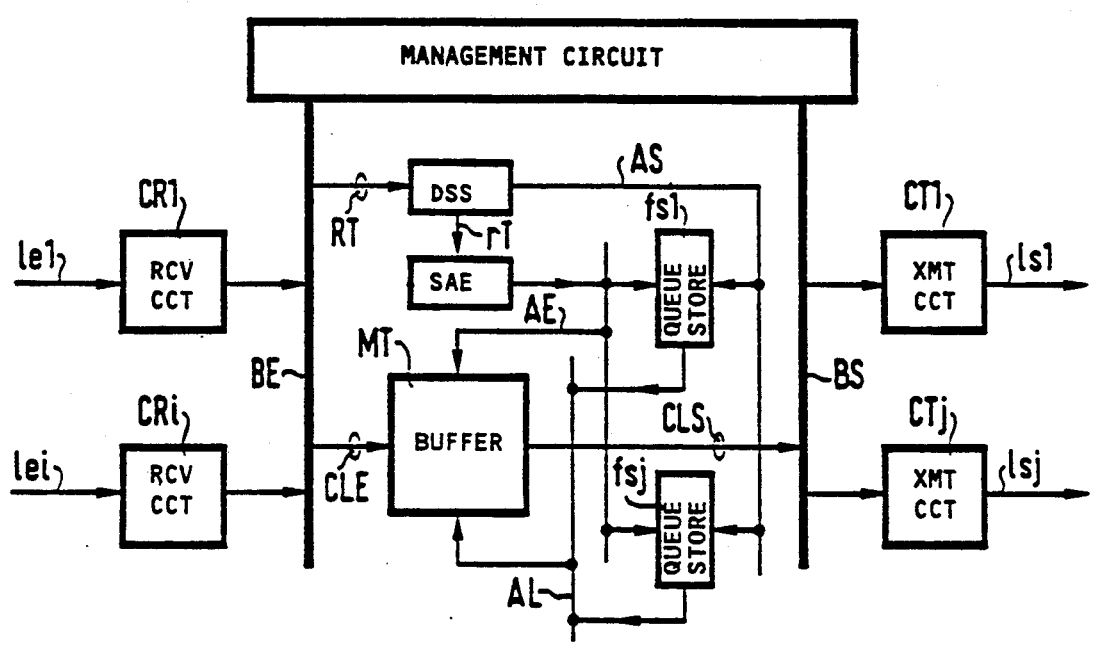
FIG. 1 is a block diagram of a known switching element to which the present invention is applied.

FIG. 1 shows a known circuit. The invention is applicable to switches of this type, among others. This switching element switches asynchronous time-division multiplex packets between input links le1 through lei and output links ls1 through lsj.

Each input link has a receive circuit CR1 through CRi which detects incoming packets, synchronizes them and transmits them in a time slot assigned to the input link on an input bus BE. This bus can be a parallel bus, so that all the bits of a packet are accessible simultaneously. The i input link time slots occur in sequence within an input packet time-division multiplex recurrent cycle.

A similar bus BS receives the packets to be transmitted in j successive time slots of an output packet multiplex recurrent cycle, as will be described in more detail later. Each of these time slots is assigned to one of the output links ls1 through lsj and supplies packets to a corresponding one of the transmit circuits CT1 through CTj. Each transmit circuit provides the interface between the mode of transmission of the BS bus and the mode of transmission on the links ls1 through lsj.

Each packet received and put onto the input bus BE is fed to a buffer MT. If the received packet is to be retransmitted, it is stored in the buffer at a location designated by a write address AE supplied by a write address source SAE.

At the same time, the packet label RT is passed to an output selector DSS. If routing mode data in the label RT indicates that the packet must be retransmitted, the output selector DSS supplies to the write address source SAE a signal rt commanding it to prepare a new address for the next packet. Otherwise, the address AE is kept and the next packet is substituted for the packet in question.

The output selector DSS analyzes the label RT in a manner that will be described in more detail later with reference to FIG. 3. It marks on a control link AS the identifier of any output to which the packet in question must be retransmitted. In practise the control link AS may comprise j lines, one for each output link, and the function of the output selector DSS is then to place a particular potential on the line of any output that must be selected in this way. Each line of the control link AS is connected to one of j queue stores fs1 through fsj. If the link is marked, a write operation is executed to place in the queue the address AE of the location at which the packet in question is stored in the buffer MT. The queue stores are preferably of the FIFO (first in/first out) type. According to the respective labels of the receive packets, the FIFO fsl receives the addresses of locations in the buffer MT containing packets addressed to the link lsl. The same applies to the store fsj with regard to the link lsj.

The appropriate FIFO is read during each time slot on the output bus BS. This supplies a read address AL. The appropriate location is read in the buffer MT and the read packet CLS is put on the output bus BS to be transmitted to the relevant output link.

Packets received on the input links are therefore stored temporarily in the buffer MT and, by virtue of time-division switching between the input bus BE and the output bus BS, can be transferred from any input link to any output link. The capacity of the buffer MT allows for an unequal distribution of throughput between the output links, but the imbalance between the throughputs offered to the output links must not cause congestion on any one or more output links such that the capacity of the buffer MT or that of any of the queues is exceeded.

The switching means just described make it possible to retransmit a received packet stored in the buffer MT to a plurality of output links rather than a single output link. To achieve this it is sufficient to write the address AE of the location containing that packet into a plurality of FIFO rather than a single FIFO.

FIG. 1 shows a management unit UG connected to the input bus BE and to the output bus BS and therefore able to receive some packets and to transmit others. The management unit contains all the auxiliary circuits needed to control the operation of the switching element, in particular a clock whose output signals control the operations just described.

Figure 2:
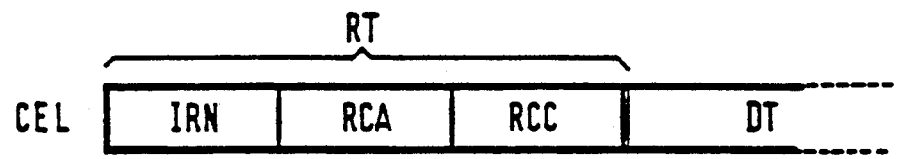
FIG. 2 shows the format of a packet label for use with the present invention.

FIG. 2 shows a packet CEL comprises a label RT followed by data DT. The label RT is in three parts, a command field RCC, a destination indication in the form of a network output address RCA and an internal reference number IRN.

The command field RCC contains routing mode data which can designate a direct routing mode or a translated routing mode or any other mode for which provision is made. If the command field RCC designates the direct routing mode, a destination indication derived from the network output address RCA must be used to route the packet to an output from which the indicated destination can be reached. If the command field RCC designates the translated routing mode, the reference number IRN must be used to route the packet to one or more outputs whose identifiers are available in the switching element as will now be described with reference to FIG. 3.

Figure 3:
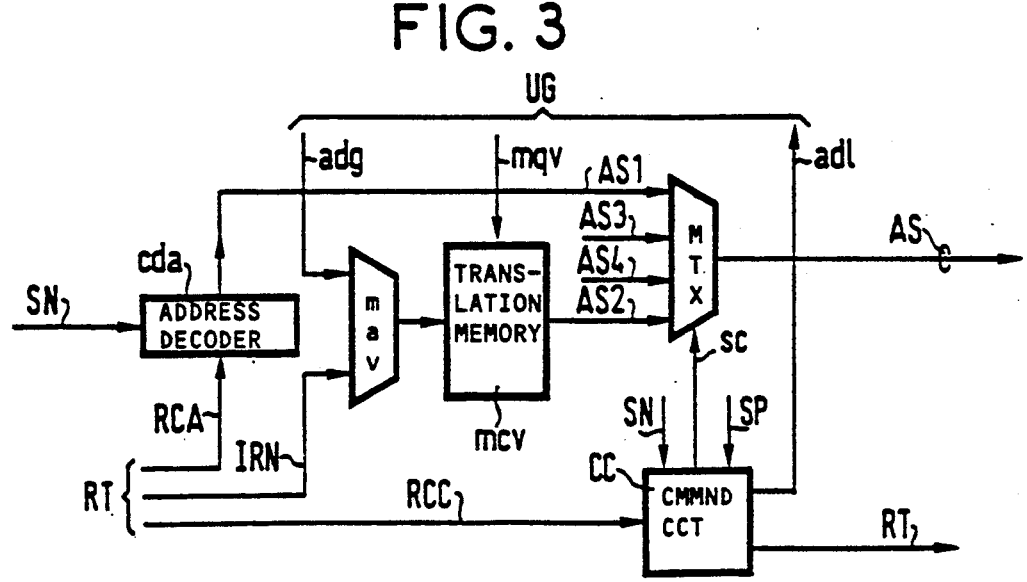
FIG. 3 shows output selection circuitry in accordance with the invention usable in the switching element from FIG. 1.

FIG. 3 shows one embodiment of the output selector DSS from FIG. 1 in which the present invention is implemented.

The output selector receives the label RT of a packet. The command field RCC is supplied to a command circuit CC which decodes it and combines it with semi-permanent internal situation data SN and semi-permanent internal priority data SP to derive the signal sc controlling a command multiplexer MTX. The command circuit CC also produces for any packet that must be stored in the buffer MT the signal rp which commands the preparation of a new buffer address used to store the next packet. It produces for any service packet that must be transmitted to the management unit UG, instead of the signal sc or the signal rc, a service signal acl which requests the management unit to read the packet on the input bus BE at this time.

The network output address RCA is transmitted to an address decoder cda which also receives the semipermanent data SN and provides in response one or more signals on the lines of a direct command link AS1 connected to the command multiplexer MTX. The device cda is therefore a direct routing device which, receiving a destination indication from the label of a received packet, translates it into an output identifier for at least one output.

The internal reference number IRN is applied through an address multiplexer mav to a translation memory MCV which supplies in response one or more signals on the lines of a translated command link AS2 also connected to the command multiplexer MTX. The translation memory is therefore a translated routing device which, receiving a reference number from the label of a received packet, translates it into one or more output identifiers.

The command multiplexer MTX receives further signals on a cross-connect command link AS3 and on a broadcast link AS4. On the cross-connect command link AS3 an output identifier signal is present on one line only. The means employed to this end are not shown in the figure, but can include a shift register so that the output identifier is sequentially changed on each packet, or a quasi-random or pseudo-random selector circuit, or a selector circuit interfaced to the output FIFOs and such that the selected output identifier is that for the least heavily loaded output, etc. The broadcast link AS4 carries one signal per line and causes the packet to be broadcast to all the outputs of the switching element. The multiplexer MTX selects the signals from one of the four command links AS1 through AS4 and supplies them on the FIG. 1 command link AS, so specifying the output links to which the packets received and stored in the switching element buffer are retransmitted.

The management unit UG sends a write address adg to the address multiplexer mav so that routing information can be entered into the translation memory mcv via the link mcv.

The resources as just described therefore provide four routing modes: direct routing, translated routing, cross-connect routing and broadcast routing. These four modes will now be described with reference to FIG. 4.

Figure 4:
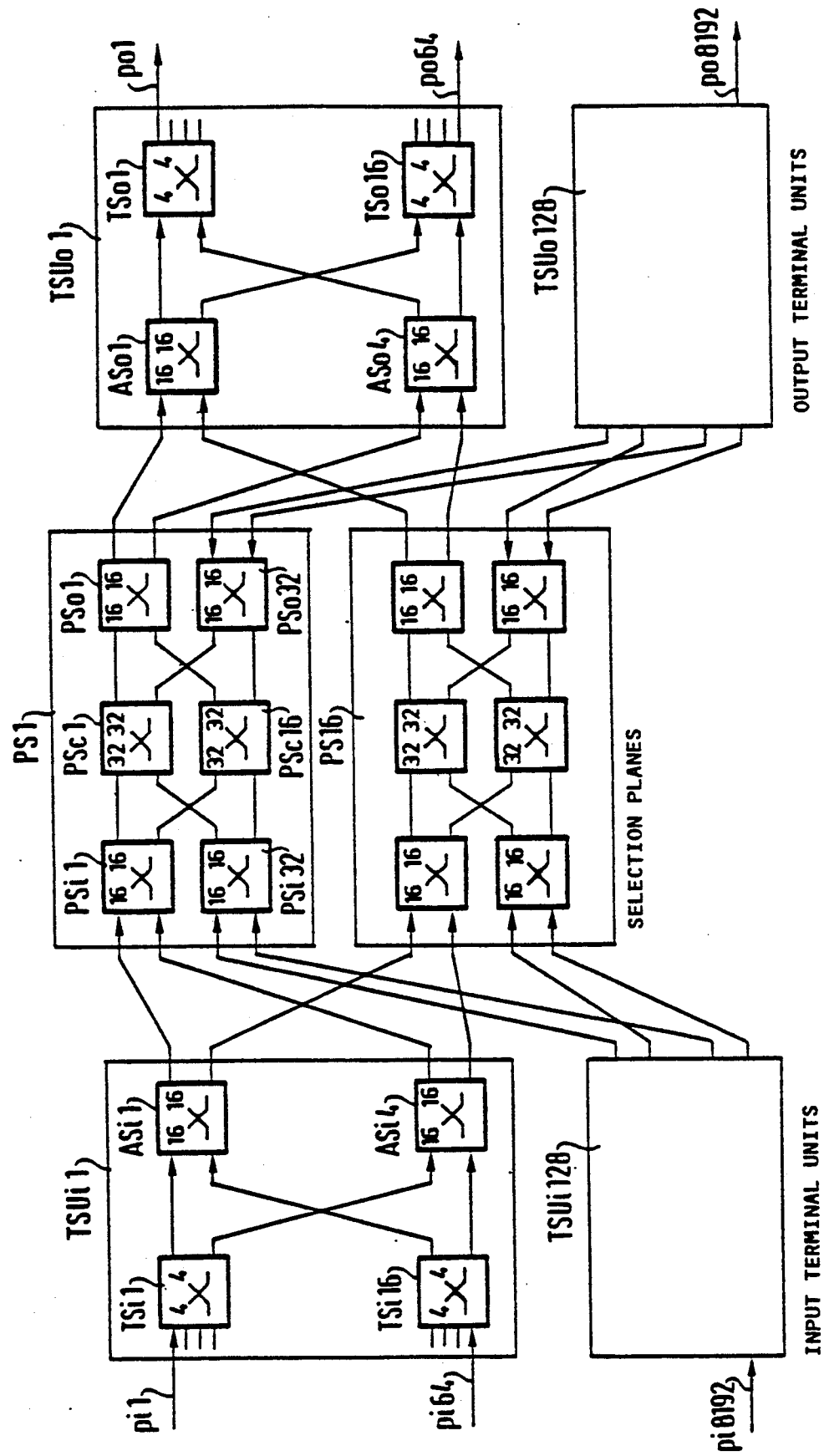
FIG. 4 shows a switching network in accordance with the present invention.

FIG. 4 shows one switching network configuration using a switching element in accordance with the invention.

The switching network shown is made up of selector units which comprise input terminal units TSUi, selection planes PS and output terminal units TSUo. Each selector unit comprises switching elements which can be of the type shown in the previous figures, each represented by the conventional switching matrix symbol showing on the left the number of switching element inputs and on the right the number of switching element outputs. The switching elements are interconnected by links.

Any input terminal unit, the unit TSUi1, for example, comprises two stages of switching elements, the switching elements TSi1 through TSi16 and the switching elements ASi1 through ASi4. There is a single link between an output of a first stage switching element and an input of a second stage switching element. The four outputs of a first stage switch (TSi1, for example) are each connected to one input of each of the four second stage switching elements. The 16 inputs of a second stage switching element (ASi1, for example) are therefore each connected to one output of each of the 16 first stage switching elements. The 64 inputs of the first stage switching elements are connected to 64 input ports pi1 through pi64. The other input terminal units can be similar, apart from the numerical values. The output terminal units are similarly and symmetrically arranged. Thus the output terminal unit TSUo1, for example, provides access to output ports po1 through po64 via the two stages of switching elements comprising switching elements ASo1 through ASo4 and TSo1 through TSo16.

The figure also shows input and output terminal units TSUi128 and TSUo128 to indicate a total number of terminal units of the switching network.

The selection planes PS1, etc comprise three selection stages in the form of switching elements PSi1 through PSi32, PSc1 through PSc16 and PSo1 through PSo32, which may be of the type shown in FIGS. 1 and 3. The arrangement of the internal links between one stage and the next conforms to the same general principle as the terminal selector unit links; this will not be described in detail.

There are 16 selection planes PS1 through PS16. The 16 outputs of a switch of an input terminal selector unit (TSUi1, for example) are individually connected by 16 links to an input of each of the 16 selection planes. The four outputs of the same rank of the four switching elements of an input terminal unit (TSUi1, for example) are connected to successive inputs of the same switching element (PSi1, for example) of a selection plane, the selection plane PS1 in this instance. The 512 inputs of a selection plane (PS1, for example) are therefore connected in fours to the four switching elements of each of the 128 input terminal units.

The arrangement of the links between the outputs of the selection plane third stage switching elements (PSo1 through PSo32 for the selection plane PS1, for example) and the output terminal unit second stage switching elements is symmetrical to that just described.

The entire switching network is symmetrical about the central selection planes stage. Each central switching element (PSc1, for example) has access to all the input ports and to all the output ports through three switching stages on each side. Conversely, there are 256 separate paths through the 256 central switching elements from any input port to any output port. Given that there are virtually no internal losses, as a result of the use of links between switches relying on temporary storage in a buffer enabling relative long wait times, a packet can be routed non-selectively between this input port and any of the central switching elements. Thereafter routing is necessarily selective, to reach the destination output port. In the case of point-to-multipoint routing, where it is necessary to reach a plurality of separate output ports, the selective routing must comprise multiple branches.

Note that the network may comprise a plurality of sub-links per link, each link being then connected from multiple outputs of a switching element of one stage to multiple inputs of a switching element of a following stage, the dimensions of the switching elements being increased accordingly. This makes it possible to increase the traffic handling capacity of the switching network and, where appropriate, the number of input and output links connected to its ports. This has no effect on what is described below, except with regard to the numerical values given and, in some cases, the need to effect a selection between the various outputs relating to the same link, by virtue of the arrangements already mentioned.

Bearing in mind what has been described previously, specifically in relation to the retransmission control means in the form of the output selector device in FIGS. 1 and 3, there will now be described how the various routing modes are applied in the switching elements of the FIG. 4 network.

Consider first direct routing, for example between the input port pi1 and the output port po1. In the packet label routing data in the command field RCC specifies direct routing. The output address RCA comprises seven bits designating the terminal unit TSUo1 and six bits designating the output port po1.

In the switching network first stage switching elements TSi1, etc the semi-permanent data SN is such that, when combined with the direct routing data in the command circuit CC, it produces a value of the command signal such that the multiplexer MTX selects the command link AS3. The packet is retransmitted to one of the set of all outputs of the switching element. The conditions governing this selection will be described later. The packet is therefore retransmitted to the switching element ASi1, for example.

In the switching network second stage switching elements ASi1, etc the semi-permanent data SN has the same effect as in the first stage and the packet is therefore retransmitted to one of the set of all outputs of the switching element, for example that which leads to the plane PS1, and, in this plane, to the switching element PSi1.

The same applies to the switching network third stage switching elements and in this way the packet reaches the switching element PSc1, for example.

From the central stage onwards routing is at least in part selective.

The switching network central stage switch semipermanent data SN is such that, via the command signal sc, the command circuit CC connects the multiplexer MTX to the command link AS1. The same semi-permanent data SN is applied to the decoder cda which additionally receives the output address RCA. The decoder cda responds by selecting from the seven bits designating the destination terminal unit the five bits which designate the only output leading to that of the 32 switching elements of the switching network fourth stage which, in the plane PS1, accesses the destination terminal unit. This selects the output leading to the switching element PSo1.

The switching network fifth stage switching elements operate in a similar manner to what has just been described. The semi-permanent data SN is different, but still results in routing from the multiplexer MTX to the command link AS1. In the decoder cda, the new value of the semi-permanent data SN leads to selection of the remaining two bits of the destination terminal unit identifier, which identifies the four outputs leading to the four switching elements ASo1 through ASo4 in this example. One of these four outputs is selected as described above (sequentially, quasi-randomly or depending on the load, as already explained). It can convey the packet to the switch ASo1, for example.

In the switching network sixth stage switching elements the semi-permanent data SN connects the multiplexer MTX to the command link AS1 and this time the decoder is put into a state such that it selects from the six bits of the RCA address designating the output port the four bits which identify the switching element serving this output port. In this example the packet is therefore conveyed to the switching element TSo1.

Finally, in the switching network final stage switching element the semi-permanent data SN similarly causes the packet to be routed to the output port Po1.

Along this direct routing the semi-permanent data SN is therefore first used to convey the packet non-selectively to any switching element of the central stage and then to convey it selectively to the indicated destination, using the successive parts of the output address RCA.

It is a simple matter to verify that, provided that all the switching elements of the central stage in a selection plane see the 32 switching elements of the fifth stage of the selection plane in the same way, the routing is exactly the same in each of them. Likewise, provided that all the selection planes see the output terminal units in the same way, it is possible to conclude that all the switching elements of the central stage carry out direct routing in the same way. Similar reasoning leads to the same conclusion in respect of the switching elements of other stages, from the fifth through the final stages. The conclusion is that the semi-permanent data SN must in actual fact characterize only the identity of the stage in which the switching element is included, not its position within the stage.

It should be emphasized that successive packets from the same source and with the same destination can, mainly due to the cross-connect routing carried out in the first stages of the switching network, take a large number of different paths, which achieves crossconnection of the traffic flow favoring homogeneous processing of varied packet throughputs presented to the switching network.

The translated routing situation will now be described on a comparative basis; the packet label includes in the command field RCC translated routing data and an internal reference number IRN. Initially it will be assumed that, although this is not the preferred application of this routing mode, the requirement is to route the packet to a single output port, the output port Po1 again, for example.

Although the routing data is different, the path of the packet in the non-selective part, as far as the central stage of the switching network, is exactly the same as has just been described and, referring to the same example, leads to the switching element PSc1.

Here the value of the semi-permanent data SN is such that the command circuit CC causes the command signal sc to connect the multiplexer MTX to the translated routing command link AS2. Via the appropriately oriented multiplexer mav, the internal reference number IRN addresses the translation memory mcv so that a corresponding location is read. The routing information there is the identifier of the fifth stage switch to be reached, which is the switch PSo1 in this instance.

In the switch PSo1 the process is then exactly the same and the information supplied by the translation memory, read at the same address, is this time the identifier of one of the outputs leading to one of the switching elements of the sixth stage of the output terminal unit TSUo (ASo1, for example). As an alternative to this, it would be possible to obtain the identifiers of four outputs leading to the four switching elements ASo1 through ASo4 of this terminal unit, but it would then be necessary to add to the FIG. 3 device a sequential, quasi-random or load-dependent selector circuit as described above.

The same goes for subsequent stages up to the final stage. Translated routing in this form therefore offers exactly the same features as direct routing. In particular, it retains any cross-connections effected in the first three stages of the switching network, with the result that the packet path can pass through any of the switching elements of the central stage of the network. However, this is at the cost of a marking operation entailing writing routing information containing the appropriate output identifier or identifiers into the translation memories of the switching elements encountered on the various paths that the packet can take. It will readily be understood that the minimum requirement is then to mark in this way all the switching elements of the central stage and then one per plane in the fifth stage, all the switching elements of the sixth stage in the output terminal unit and, finally, the switching element of the final stage serving the target output port.

If required, translated routing can apply to a greater number of switching network stages or even to all network stages, however. It is sufficient to provide sufficient routing data for this situation, determining the application of translated routing, for example as early as from the first stage of the switching network. It is then possible to determine end to end routing by designating the output to be used in each switch. This facility can be used for maintenance operations in particular. The marking operations will then concern only one switch per stage.

However, the advantage of the translated routing mode is essentially that it lends itself to point-to-multipoint routing, as already explained. This subject will therefore be further explained with reference to the routing example given above, with cross-connection up to the central stage and selective routing thereafter only.

For example, if the packet whose path up to the output pol has just been described must also be retransmitted to other outputs of the switching element TSo1, it is sufficient for this to be indicated in the translation memory so that the latter supplies routing information designating also these other outputs in exchange for the reference number IRN.

If the packet must also be retransmitted to one or more output ports served by other switching elements of the final stage, but still in the same terminal unit TSU1, the routing information of the switching element ASo1, or of each of the switching elements ASo1 through ASo4 in the variant mentioned above, must also be appropriately modified, while appropriate routing information must be written into the translation memories of the other switching elements of the final stage.

This amounts to broadcasting to any plurality of output ports of a terminal unit. Broadcasting to any plurality of output ports of a plurality of terminal units accessible via the same switching element of the fifth stage of each selection plane requires marking in this switch of the fifth stage, in each selection plane, and appropriate marking in the terminal units concerned, as just explained. If the terminal units depend from different fifth stage switches, it is also necessary in each selection plane to mark the switches of the central stage and these various switches of the fifth stage.

Generalizing the argument, broadcasting may be applied to a variable number of switching network stages, beginning with the final stage. By enabling the use of translated routing to be restricted to stages from the central stage, the invention limits recourse to translated routing.

By offering the possibility of successive use of direct routing and translated routing for the same packet, the invention enables further restriction of recourse to translated routing, as will now be explained.

Take first the case of broadcasting to a plurality of output ports of the same switching element of the final stage, and bear in mind what has been described already: direct routing will be applied using a label comprising routing data RCC interpreted in the switches of successive stages according to the semi-permanent data SN of each stage and in such a way as to cause cross-connect routing up to the central stage, direct routing to the sixth stage, under the control of an output address RCA which can be the address of any output of the switching element concerned, then translated routing in this switching element only, under the control of the reference number IRN. It can be seen that in this case the necessary marking can be restricted to the switch concerned.

If broadcasting is to output ports of a plurality of switching elements of the same terminal unit, in a similar way, but with different routing data, direct routing will be employed up to the fifth stage and translated routing will apply only in the last two stages in the terminal unit. Consequently, the marking required will be limited to the relevant switches of the terminal unit.

If the broadcasting is to a plurality of terminal units accessible via the same switching element of the sixth stage, in a similar way direct routing may be employed for the fourth stage and the marking requirements limited accordingly.

All that this requires is a set of similar routing data, differing only in that a different stage from which translated routing mode is to be applied is designated. The routing mode data can specify a switching element stage number and the routing mode selection means are so arranged that the translated routing mode is applied only if the stage number is equal to or greater than that supplied by the semi-permanent data SN.

The requirements in respect of the marking information to be written into the switch translation memories are now defined. The present invention enables these requirements to be satisfied in a particularly simple and effective manner, as will now be described.

According to the invention, the marking information conveyed in the packets routed by the switching network reaches the switching elements of an entire switching stage using the broadcast routing mode, the internal priority data SP making it possible to avoid superfluous broadcasting which would load the switching network to no useful purpose.

The marking of the switching elements of the central stage for translated routing to output ports of the same terminal unit (TSU1, for example) will be described first. Any input port of the switching network (pi1, for example) is used to input a marker packet whose label includes special routing data. The internal reference number and marking information containing the identifier of the target terminal unit are included in the data part of the packet.

In each switch that the packet passes through the routing will take place in a similar way to those for previous routing situations by combining the routing data and the semi-permanent situation data SM defining the stage containing the switch. In the switch TSi1, this causes the packet to be broadcast to all the outputs. In the switch ASi1, for example, the priority data SP being determined accordingly, this also causes the packet to be broadcast to all the outputs, in other words towards one input of each selection plane. In the other switches of the same stage, ASi2 through ASi4, on the other hand, the priority SP is different and prevents routing of the packet, which is achieved very simply given that (FIG. 3) the command circuit CC supplies a command signal sc such that the multiplexer MTX does not select any command link.

In an alternative arrangement, rather than inhibiting the routing of a packet already received in some switching elements, the information SP for the switching elements ASi1 through ASi4 could be relayed to the switching elements of the previous stage, accessing these switches ASi1 through ASi4, that is to say to the switching elements TSi1 through TSiT, so that the routing of a marker packet by any of the latter switching elements results in the selection of the highest priority second stage switching element (ASi1, in this instance), which achieves the same result as previously with regard to routing of the marker packet.

Be this as it may, in switch PSi1 of plane PS1 the same principle causes the packet to be broadcast to all the outputs. The packet therefore reaches all the switching elements of the central stage of selection plane PS1. The same applies to the other planes. In each switching element and because of the nature of its routing data, the marker packet causes the signal adl to be generated (FIG. 3) and the packet to be received by the management unit UG of the switching element (FIG. 1). By way of return, the management unit sends output identifier information to the translation memory mcv over the link mgv, the reference number IRN being supplied simultaneously on the address line adg and the multiplexer mav being connected appropriately at this time.

The same procedure will be employed to broadcast a marker packet to switching elements of the fifth stage. In each selection plane, all the switching elements of the central stage receive this packet but only the one in which the priority data SP allows this will route the packet to all the switches of the next stage. They will accept the packet as a marker packet. As the marking information includes the designation of the target terminal unit (TSUo1) and because a single switching element provides access to the selection unit TSUo1, only the latter will act on the marking received and write into its translation memory the corresponding output identifier information.

The invention further provides for combining the two marking operations just described. The content of the packet may be the same in both cases. The same packet is therefore transmitted to the management units of the central stage switching elements and is also retransmitted by a highest priority central switching element of each selection plane to the switching elements of the next stage.

The marking is the same in the case of broadcasting to output ports of a plurality of terminal units. It is sufficient for the packet to identify them all. To this end the information carried by the marker packet may include one bit for each terminal unit, for example. If the packet is not big enough to allow this, a plurality of consecutive numbered packets may be used for this purpose. Each central stage switch derives from this information the corresponding output identifiers. The same applies to the relevant switches of the next stage.

A similar procedure will be used for marking in the target terminal unit TSUo1. A marker packet containing the same reference number as in the previous case but in this case accompanied by the identifier of the output port or ports to be marked is broadcast to all the switches ASo1 through ASo4 of the penultimate stage of the terminal unit. One of them, that having the highest priority, retransmits it to the final stage switches. Only those which provide access to the target output ports will act on the marking received and will each write into their translation memory the corresponding output identifier information.

Broadcasting to the switching elements ASo1 through ASo4 will take place from a switching element of a selection plane determined for this purpose and reached by direct routing. To this end the packet label includes special routing data interpreted as direct routing data in the previous stages of the switching network accompanied by any terminal unit TSuo1 destination indications. Reaching the switching elements in question (PSo1, for example), the special routing data causes broadcasting to the output leading to the terminal unit TSUo1 (rather than the selection of a single output).

Of course, in the case of broadcasting to output ports of a plurality of terminal units, marking must be carried out for each unit.

In the final analysis, it is seen that the invention makes it possible to reduce the marking operations in the case of broadcasting to marking of the selection plane followed by marking for each target terminal unit, each marking giving rise to the routing of one packet (or group of packets) to the relevant switching elements.

It is obvious that the previous description has been given by way of non-limiting example only and that numerous variations thereon may be proposed without departing from the scope of the invention. As has already been explained, the word "packet" must be interpreted in the widest possible sense encompassing any form of presentation of the information to be switched. Also, one network configuration in which the invention finds application has just been described. There are numerous network configurations enabling cross-connect operations in the first stages and selective operations in subsequent stages. There are also numerous selective stage configurations comprising selection units accessed via central stages themselves arranged in selection units or other selection planes. It is obvious that, subject to modifications that will be obvious to those skilled in the art, the invention is also applicable in such circumstances.

There is claimed:

1. Switching element with a plurality of modes of operation for switching asynchronous time-division multiplexed packets, said switching element comprising:

at least one input,
a plurality of outputs,
selective retransmission means for retransmitting a packet received on said at least one input to one or more of the outputs on a basis of routing data associated with said packet, said selective retransmission means having a plurality of modes of operation, and
retransmission control means for determining one of the modes of operation of said selective retransmission means, said retransmission control means comprising
direct routing means for receiving from a label of a packet received on said at least one input, a destination indication and for using a fixed routing algorithm to decode the destination indication into a single output identifier corresponding to at least one of the outputs in order to retransmit the packet to an output designated by said output identifier,
translated routing means for receiving from the label of the packet received on said at least one input, a virtual circuit reference number and for using virtual circuit data temporarily stored in a translation memory to translate the virtual circuit reference number into one or more output identifiers each corresponding to at least one output, for retransmitting the packet to one output for each output identifier designated by said one or more output identifiers,
a non-selective routing means in which a particular one or more outputs to which the packet is retransmitted is selected independently of any destination identification or virtual circuit reference numbers included in the received packet, and
routing mode selector means for receiving routing mode data included in the label of a packet received on said at least one input for selectively commanding, in accordance with the received routing mode data, the use of a routing device selected from a group comprising said direct routing means, said translated routing means, and said non-selective routing means.

2. Switching element according to claim 1 wherein said non-selective routing means incorporates a cross-connect routing mode in which the packet received is routed to a randomly or quasi-randomly selected output of the switching element.

3. Switching element according to claim 1 wherein said non-selective routing means incorporates a broadcast routing mode in which the receive packet is routed to all the outputs of the switching element.

4. Switching element according to claim 1 wherein said routing mode selector means also uses situation data received from the switching element in the selection of said routing device.

5. Switching element according to claim 4 wherein said routing mode selector means receives from the label of a packet received at said at least one input, routing mode data which specifies a switching element stage number in a switching network and selects the non-selective routing means if said stage number is less than a value derived from said situation data.

6. Switching element according to claim 4 wherein said routing mode selector means receives from the label of the packet received on said at least one input, routing mode data which specifies two routing modes and a switching element stage number in a switching network, and said routing mode selector means selects a first of said specified routing modes if said stage number is less than a value derived from said situation data and the second of said specified routing modes is used if said stage number is equal to or greater than said derived value.

7. Switching element according to claim 1 wherein said destination indication and said virtual circuit reference number occupy a same field in the label of the packet.

8. Switching element according to claim 1 wherein said routing mode selector means receives semi-permanent priority data from the switching element and uses said semi-permanent priority data and said routing mode data to selectively command the use or the inhibiting of any said routing mode.

9. Switching network comprising
a plurality of input ports,
a plurality of output ports,
a plurality of switching elements arranged in a plurality of interconnected switching element stages, each switching element having inputs and outputs and means for transferring a packet received on one of its inputs to one or more of its outputs in accordance with routing data associated with said packet, the input ports of the network corresponding to the inputs of switching elements of a first stage and the output ports of the network corresponding to the outputs of the switching elements of a final stage,
wherein all the switching elements of at least one stage of said switching network are each in the form of a switching element with a plurality of modes of operation and comprising
at least one input,
a plurality of outputs,
selective retransmission means for retransmitting a packet received on said at least one input to one or more of the outputs on a basis of routing data associated with said packet, said selective retransmission means having a plurality of modes of operation, and
retransmission control means for determining one of the modes of operation of said selective retransmission means, said retransmission control means comprising direct routing means for receiving from a label of a packet received on said at least one input, a destination indication and for using a fixed routing algorithm to decode the destination indication into a single output identifier corresponding to at least one of the outputs in order to retransmit the packet to an output designated by said output identifier,
translated routing means for receiving from the label of the packet received on said at least one input, a virtual circuit reference number and for using virtual circuit data temporarily stored in a translation memory to translate the virtual circuit reference number into one or more output identifiers each corresponding to at least one output, for retransmitting the packet to one output for each output identifier designated by said one or more output identifiers,
a non-selective routing means in which a particular one or more outputs to which the packet is retransmitted is selected independently of any destination identification or virtual circuit reference numbers included int he received packet, and
routing mode selector means for receiving routing mode data included in the label of a packet received on said at least one input for selectively commanding in accordance with the received routing mode data the use of a routing device selected from the group comprising said direct routing means, said translated routing means, and said non-selective routing means.

10. Switching network according to claim 9 wherein the switching elements of all stages of said switching network are each in the form of said switching element having a plurality of modes of operation.

11. Switching network according to claim 9 wherein, in the switching elements of at least a first stage of the switching network, a non-selective cross-connect routing mode is used, in which any received packet is retransmitted to a randomly or quasi-randomly selected output of the switching element.

* * * * *